United States Patent
Miller et al.

(10) Patent No.: US 8,136,053 B1
(45) Date of Patent: *Mar. 13, 2012

(54) DIRECT, GESTURE-BASED ACTIONS FROM DEVICE'S LOCK SCREEN

(75) Inventors: James B. Miller, Sunnyvale, CA (US); Jean-Michel Trivi, Boulder Creek, CA (US)

(73) Assignee: Google Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/170,798

(22) Filed: Jun. 28, 2011

Related U.S. Application Data (63) Continuation of application No. 12/780,659, filed on May 14, 2010.

(51) Int. Cl.
   *G06F 3/033* (2006.01)

(52) U.S. Cl. ........ 715/863; 715/702; 715/864; 345/156; 345/169; 345/173; 379/142.05; 455/26.1

(58) Field of Classification Search ............... 345/156, 345/169, 173; 715/702, 863, 864; 379/142.05; 455/26.1

See application file for complete search history.

(56) References Cited

U.S. PATENT DOCUMENTS

| | | | |
|---|---|---|---|
| 7,593,000 B1 | 9/2009 | Chin | |
| 7,603,105 B2 * | 10/2009 | Bocking et al. | 455/411 |
| 7,689,939 B1 * | 3/2010 | Becker | 715/867 |
| 2003/0100295 A1 * | 5/2003 | Sakai et al. | 455/415 |
| 2003/0135292 A1 * | 7/2003 | Husgafvel et al. | 700/83 |
| 2004/0075701 A1 * | 4/2004 | Ng | 345/867 |
| 2005/0003851 A1 | 1/2005 | Chrysochoos et al. | |
| 2005/0216867 A1 * | 9/2005 | Marvit et al. | 715/863 |

(Continued)

FOREIGN PATENT DOCUMENTS

EP    1 284 450 A2    2/2003

(Continued)

OTHER PUBLICATIONS

European Patent Office, "PCT—Notification of Transmittal of the International Search Report and the Written Opinion of the International Searching Authority, or the Declaration and Written Opiion of the International Searching Authority," mailed Aug. 9, 2011, (International Appln. No. PCT/US2011/036318, International Filing Date: May 12, 2011), 14 pages.

(Continued)

*Primary Examiner* — Tuyetlien Tran
(74) *Attorney, Agent, or Firm* — Sterne, Kessler, Goldstein & Fox P.L.L.C.

(57) ABSTRACT

Embodiments enable a mobile device to execute an action analogous to a user-defined action in response to receipt of a gesture analogous to a user-defined gesture. In a first embodiment, a computer-implemented method executes an action on a mobile device. A lock screen view is displayed on the mobile device to prevent unauthorized and inadvertent access to the mobile device's data. While the mobile device is locked, a touch gesture having a pre-defined shape is detected on a touch screen of the mobile device independently of the initial position of the touch gesture on the touch screen. In response to detection of the touch gesture, a particular action is executed on the mobile device while the mobile device stays locked. The particular action determined according to the pre-defined shape. In this way, detection of the touch gesture causes the particular action to execute while keeping the mobile device locked.

20 Claims, 4 Drawing Sheets

U.S. PATENT DOCUMENTS

| | | | |
|---|---|---|---|
| 2006/0023699 A1* | 2/2006 | Engstrom et al. | 370/352 |
| 2006/0031786 A1* | 2/2006 | Hillis et al. | 715/863 |
| 2006/0075250 A1* | 4/2006 | Liao | 713/182 |
| 2006/0129444 A1* | 6/2006 | Baeza et al. | 705/8 |
| 2007/0150826 A1* | 6/2007 | Anzures et al. | 715/772 |
| 2007/0150842 A1* | 6/2007 | Chaudhri et al. | 715/863 |
| 2007/0265031 A1* | 11/2007 | Koizumi et al. | 455/556.1 |
| 2007/0271527 A1* | 11/2007 | Paas et al. | 715/810 |
| 2008/0162971 A1* | 7/2008 | Venkata et al. | 713/324 |
| 2008/0220752 A1* | 9/2008 | Forstall et al. | 455/415 |
| 2008/0278455 A1* | 11/2008 | Atkins et al. | 345/173 |
| 2008/0310602 A1* | 12/2008 | Bhupati | 379/88.12 |
| 2009/0007017 A1* | 1/2009 | Anzures et al. | 715/835 |
| 2009/0036100 A1* | 2/2009 | Lee | 455/411 |
| 2009/0051648 A1* | 2/2009 | Shamaie et al. | 345/156 |
| 2009/0061823 A1 | 3/2009 | Chu | |
| 2009/0061837 A1* | 3/2009 | Chaudhri et al. | 455/418 |
| 2009/0259968 A1 | 10/2009 | Hsieh et al. | |
| 2009/0262078 A1 | 10/2009 | Pizzi | |
| 2009/0284482 A1* | 11/2009 | Chin | 345/173 |
| 2009/0288032 A1* | 11/2009 | Chang et al. | 715/776 |
| 2009/0289916 A1* | 11/2009 | Dai | 345/173 |
| 2010/0001967 A1* | 1/2010 | Yoo | 345/173 |
| 2010/0005428 A1* | 1/2010 | Ikeda et al. | 715/863 |
| 2010/0017872 A1 | 1/2010 | Goertz et al. | |
| 2010/0060586 A1* | 3/2010 | Pisula et al. | 345/169 |
| 2010/0064261 A1* | 3/2010 | Andrews et al. | 715/863 |
| 2010/0099394 A1* | 4/2010 | Hainzl | 455/418 |
| 2010/0123724 A1* | 5/2010 | Moore et al. | 345/473 |
| 2010/0125785 A1* | 5/2010 | Moore et al. | 715/702 |
| 2010/0127998 A1 | 5/2010 | Hyun | |
| 2010/0146235 A1 | 6/2010 | Weber et al. | |
| 2010/0146384 A1 | 6/2010 | Peev et al. | |
| 2010/0146437 A1* | 6/2010 | Woodcock et al. | 715/806 |
| 2010/0159995 A1* | 6/2010 | Stallings et al. | 455/566 |
| 2010/0162169 A1* | 6/2010 | Skarp | 715/833 |
| 2010/0162182 A1* | 6/2010 | Oh et al. | 715/863 |
| 2010/0225443 A1 | 9/2010 | Bayram et al. | |
| 2010/0225607 A1 | 9/2010 | Kim | |
| 2010/0240415 A1 | 9/2010 | Kim et al. | |
| 2010/0245277 A1 | 9/2010 | Nakao | |
| 2010/0248689 A1 | 9/2010 | Teng et al. | |
| 2010/0257447 A1* | 10/2010 | Kim et al. | 715/702 |
| 2010/0257490 A1* | 10/2010 | Lyon et al. | 715/863 |
| 2010/0269040 A1 | 10/2010 | Lee | |
| 2010/0306693 A1* | 12/2010 | Brinda | 715/784 |
| 2010/0306705 A1 | 12/2010 | Nilsson et al. | |
| 2010/0306718 A1 | 12/2010 | Shim et al. | |
| 2010/0315358 A1* | 12/2010 | Chang et al. | 345/173 |
| 2010/0318366 A1* | 12/2010 | Sullivan et al. | 704/275 |
| 2011/0047368 A1* | 2/2011 | Sundaramurthy et al. | 713/100 |
| 2011/0081889 A1* | 4/2011 | Gao et al. | 455/411 |
| 2011/0159844 A1* | 6/2011 | Gillet et al. | 455/411 |

FOREIGN PATENT DOCUMENTS

| | | |
|---|---|---|
| EP | 1 942 398 A1 | 7/2008 |
| WO | WO 2010/040670 A2 | 4/2010 |
| WO | WO 2010/144732 A2 | 12/2010 |

OTHER PUBLICATIONS

Roland Hutchinson, "SmartScreen iPhone App Now Available," Nov. 21, 2009, retrieved from the internet: URL:http://www.geeky-gadgets.com/smartscreen-iphone-app-new-available-21-11-2009/[retrieved on Jul. 27, 2011] the whole document, 3 pages.

Office Action for U.S. Appl. No. 12/780,659, dated Oct. 28, 2011.

* cited by examiner

DIRECT, GESTURE-BASED ACTIONS FROM DEVICE'S LOCK SCREEN

This application is a continuation of U.S. patent application Ser. No. 12/780,659, filed May 14, 2010, incorporated herein in its entirety.

BACKGROUND

1. Field of the Invention

This field relates to touch gestures on a mobile device.

2. Background Art

Some mobile devices, such as cell phones, personal digital assistants (PDAs), portable navigation devices (PNDs) and handheld game consoles, include touch screens. These devices accept input by detecting movements, known as touch gestures, of fingers or other objects in contact with the touch screen. Upon detection of a touch gesture, the mobile device, or an application stored thereon, may execute an action. For example, upon detection of a pinch touch gesture, a web browsing application may zoom out of a web page.

Mobile devices generally include lock screens to prevent unauthorized or unintentional access to the device. Mobile devices running the ANDROID operating system, available from Google Inc., enable a user to define a touch pattern gesture to unlock a touch screen. This feature, known as pattern unlock, enables a user to define a gesture to authenticate the user and unlock the device. Once the device is unlocked, user can execute functionality of the mobile device. However, unlocking the mobile device and then executing the desired action is a multi-step process and can be cumbersome.

Systems and methods are needed that enable users to access more easily functionality of a locked mobile device.

BRIEF SUMMARY

Embodiments enable a user to execute an action by inputting a touch gesture directly from a lock screen. In a first embodiment, a computer-implemented method executes an action on a mobile device. A lock screen view is displayed on the mobile device to prevent unauthorized and inadvertent access to the mobile device's data. While the mobile device is locked, a touch gesture having a pre-defined shape is detected on a touch screen of the mobile device independently of the initial position of the touch gesture on the touch screen. In response to detection of the touch gesture, a particular action is executed on the mobile device while the mobile device stays locked. The particular action is determined according to the pre-defined shape. In this way, detection of the touch gesture causes the particular action to execute while keeping the mobile device locked.

In a second embodiment, a system executes an action on a mobile device. The system includes a lock screen module that displays a lock screen view on the mobile device to prevent unauthorized and inadvertent access to the mobile device's data. While the lock screen module displays the lock screen view, a gesture interpretation module detects a touch gesture having a pre-defined shape on a touch screen of the mobile device independently of the initial position of the touch gesture on the touch screen. In response to detection of the touch gesture and while the mobile device remains locked, a lock action module executes a particular action on an application of the mobile device determined according to the pre-defined shape. The mobile device comprises at least one processor and memory. In this way, detection of the touch gesture initiates the particular action while keeping the mobile device locked.

In a third embodiment, a computer-implemented method executes an action on a mobile device. When the mobile device is unlocked, a user is able to define a shape of a touch gesture to cause the mobile device to execute a particular action. A lock screen view is displayed on the mobile device to prevent unauthorized and inadvertent access to the mobile device's data. While the mobile device is locked, a touch gesture having the shape defined by the user is detected on a touch screen of the mobile device. In response to detection of the touch gesture, a particular action is executed on the mobile device while the mobile device stays locked. In this way, detection the user-defined shape securely authorizes execution of the particular action while the mobile device is locked.

Further embodiments, features, and advantages of the invention, as well as the stricture and operation of the various embodiments of the invention are described in detail below with reference to accompanying drawings.

BRIEF DESCRIPTION OF THE FIGURES

The accompanying drawings, which are incorporated herein and form a part of the specification, illustrate the present invention and, together with the description, further serve to explain the principles of the invention and to enable a person skilled in the pertinent art to make and use the invention.

The drawing in which an element first appears is typically indicated by the leftmost digit or digits in the corresponding reference number. In the drawings, like reference numbers may indicate identical or functionally similar elements.

DETAILED DESCRIPTION OF EMBODIMENTS

As mentioned above, executing actions from a lock screen can be a cumbersome multi-step process. Embodiments disclosed herein enable a user to execute an action by inputting a touch gesture directly from a lock screen. In an embodiment, the mobile device may detect the touch gesture without regard to its initial position on the touch screen. In this way, a user can execute an action while keeping the mobile device locked without looking at the mobile device's view. In another embodiment, the touch gesture to execute the action may be pre-defined by the user. In this way, detection of the touch gesture serves to verify that the user has authority to execute the action while the mobile device remains locked. These and other embodiments are described below with reference to the accompanying drawings.

Figure 1:
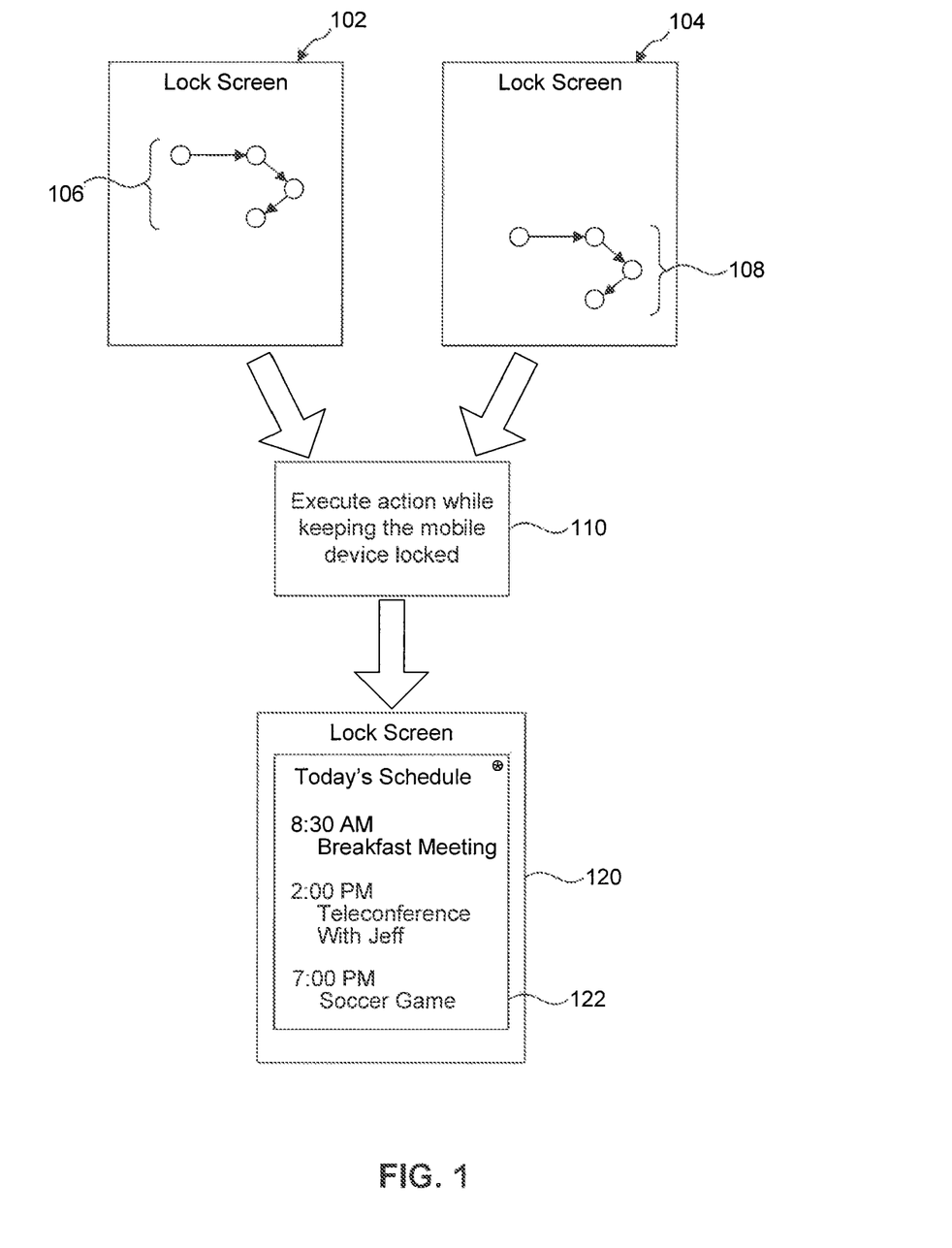
FIG. 1 is a diagram that illustrates receiving a touch gesture from a lock screen view to execute an action, according to an embodiment.

FIG. 1 shows a diagram 100 that illustrates receiving a touch gesture from a lock screen view to execute an action, according to an embodiment. Diagram 100 shows two views 102 and 104, each displaying a lock screen view. While displaying the lock screen view, a user inputs a touch gesture by, for example, touching the surface of the mobile device's touch screen and moving her finger along the screen's surface in a particular pattern.

Views 102 and 104 show corresponding touch gestures 106 and 108 respectively. Touch gestures 106 and 108 are similar in shape but are located at different positions on the touch screen. As discussed in greater detail below, the shape of touch gestures 106 and 108 may correspond to a previously defined user-input. In this way, the shape of touch gestures 106 and 108 may serve to authenticate the user and prevent unauthorized access to the device. A person of skill in the art would recognize that touch gestures 106 and 108 may include discrete positions or a continuous curve.

Despite being located at different positions on the touch screen, touch gestures 106 and 108 may cause the mobile device to execute the same action as illustrated at box 110. By detecting touch gestures independently of their positions on the touch screen, a user need not look at the mobile device's touch screen or view to execute the action. For example, a user can execute the action to silence a mobile device while keeping the mobile device discretely hidden from view. In a further embodiment, touch gestures 106 and 108 may have different sizes, but could still invoke the same action.

As mentioned above, in response to input of the touch gesture 106 or 108, the mobile device may execute an action while remaining locked. The mobile device may execute different actions in response to different gestures. For example, mobile device may change volume control, make a phone call, disable sound and alarms, execute a game, or access and display personal data.

View 120 shows one example that involves displaying personal data. In particular, view 120 shows a pop-up window 122 that displays the calendar data for today's date to a user. In short, in response to touch gesture, view 120 displays today's schedule while the mobile device remains locked. This embodiment enables a user to view more quickly and easily the day's schedule, avoiding the sometimes cumbersome process of unlocking the mobile device.

Figure 2:
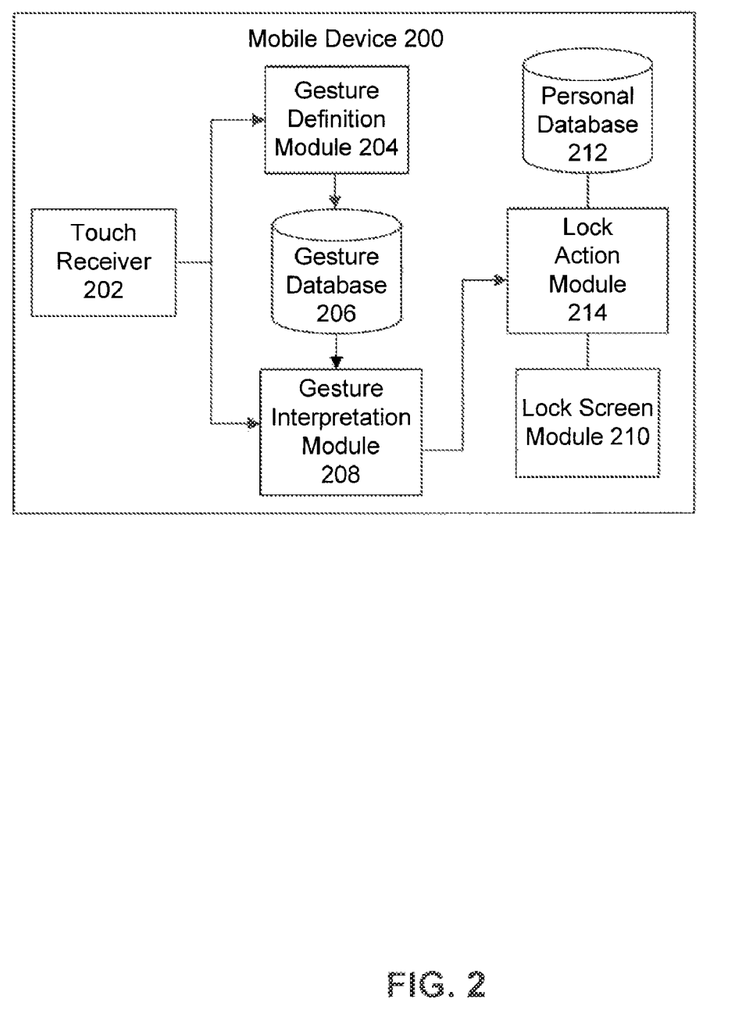
FIG. 2 is a diagram that illustrates a system for executing an action in response to a touch gesture while keeping a mobile device locked, according to an embodiment.

FIG. 2 is a diagram illustrating a mobile device 200 for executing an action in response to a touch gesture while keeping the mobile device locked, according to an embodiment. Mobile device 200 includes a touch receiver 202, a gesture definition module 204, a gesture database 206, a gesture interpretation module 208, a lock screen module 210, a lock action module 214, and a personal database 212.

In an embodiment, mobile device 200 may operate as follows. Using gesture definition module 204, a user may define a touch gesture to execute a particular action. Gesture definition module 204 may store data representing the gesture in gesture database 206. With the gesture configured, a user may be able to execute the action from the mobile device's lock screen view. Lock screen module 210 may display a lock screen view that prevents unauthorized and inadvertent access to the mobile device. While lock screen module 210 displays the lock screen view, the user may input the touch gesture on the mobile device's touch screen. Touch receiver 202 may receive the touch gesture. Gesture interpretation module 208 may compare the inputted touch gesture data with the pre-defined touch gesture data. If the inputted touch gesture data matches the pre-defined touch gesture data, the user is authenticated. Lock action module 214 may initiate an action on the mobile device while the device remains locked. In this way, mobile device 200 may securely initiate an action while keeping the mobile device locked.

Lock screen module 210 displays a lock screen view on the mobile device to prevent unauthorized or inadvertent access to a mobile device. For example, the lock screen view may serve to avoid inadvertent access to the mobile device. In that example, lock screen module 210 may not accept any other input until a particular touch gesture input is received. Receipt of the particular touch gesture input may confirm that the user intends to access the device and that the touches are not accidental touches that may for example occur when the mobile device is in a user's pocket or purse.

In addition to preventing inadvertent access, lock screen module 210 may prevent unauthorized access to the mobile device. Lock screen module 210 may prevent unauthorized access to a user's personal data on a mobile device. The lock screen module may receive an input to authenticate the user and, in response to the authenticated input, unlock the mobile device. In an example, the input may be a touch gesture that the user had pre-set for authentication purposes.

Touch receiver 202 may be any type of touch receiver that accepts input from a touch screen. In an example, touch receiver 202 may receive touch input on a view (not shown) of mobile device 200. The touch input received may include a position that the user touched as defined by an X and Y coordinate on the screen. The user may touch the screen with a finger, stylus, or other object. Touch receiver 202 may be able to receive multiple touches simultaneously if for example, the user selects multiple locations on the screen. The screen may detect touches using any technology known in the art including, but not limited to, resistive, capacitive, infrared, surface acoustic wave, strain gauge, optical imaging, acoustic pulse recognition, frustrated total internal reflection, and diffused laser imaging technologies.

In an embodiment, touch receiver 202 may receive two user inputs. For example, touch receiver 202 may sample inputs on the touch screen periodically. Touch receiver 202 may receive a first user input at a first sampling period and may receive a second user input at a second sampling period. The first user input may indicate that an object has touched a view of the mobile device, and the second user input may indicate that the object has moved to a new position. In this way, touch receiver 202 is able to receive touch gestures. In an example, a gesture may be a single stroke and may terminate with the user lifts her finger from the touch screen. In another example, a gesture may include multiple strokes.

Gesture definition module 204 enables a user to define a touch gesture to initiate an associated action. In an embodiment, gesture definition module 204 may present an interface to define a touch gesture for an action. For example, gesture definition module 204 may present the user with a list of actions for which the user may define a gesture. The user may select an action from the list of actions. In an example, the mobile device may enable a user to enter a touch gesture using an interface as described below with respect to FIG. 4. In response to the selection, gesture definition module may prompt the user for the touch gesture. The user may move her finger along the mobile device's touch screen to input the gesture. Touch receiver 202 receives the input and forwards data specifying the input to gesture definition module 210. Finally, gesture definition module 210 stores data specifying at least the shape of the touch gesture into gesture database 212. In this way, a user can define any shape for the touch gesture.

Gesture database 206 may store data specifying touch gestures for associated actions. In an embodiment, gesture database 206 may store data specifying a shape of a touch gesture and identifying an action corresponding to the touch gesture. In an embodiment, the touch gestures may be defined by a user using gesture definition module. In other embodiments, pre-defined touch gestures may not be defined by a user. For example, an "up" arrow may cause the mobile device to turn its volume up, and a "down" arrow may cause the mobile device to turn its volume down. In another example, a letter may designate a particular action. For example, the letter "D" may cause the mobile device to display the day's schedule.

Once a user defines a touch gesture, the user may input the touch gesture while the mobile device is locked to execute the action. Touch receiver 202 may receive the touch gesture on the touch screen of the mobile device.

Gesture interpretation module 208 may determine whether the inputted touch gesture matches a pre-defined touch gesture. Gesture interpretation module 208 may compare the shape of the inputted touch gesture to the shape of the pre-defined touch gesture. In an embodiment, gesture interpretation module 208 may detect a matching touch gesture regardless of a difference in position between the inputted touch gesture and the pre-defined touch gesture on the touch screen of the mobile device. By detecting the touch gesture independently from its initial position on the touch screen of the mobile device, a user can execute an action more easily without looking at the touch screen of the mobile device. This is especially useful in when the mobile device is locked, because the user may not have been actively using the mobile device before the gesture.

In an embodiment, gesture interpretation module 208 may first need to be activated by some other input. In examples, gesture interpretation module 208 may be initiated by pressing a physical button, detecting motion, or detecting a change in lighting. Gesture interpretation module 208 may provide feedback (e.g., making a sound or vibration) to indicate when it is accepting input.

When gesture interpretation module 208 detects a matching touch gesture, gesture interpretation module 208 may provide feedback to a user. For example, gesture interpretation module 208 may present a line showing the shape of the touch gesture or may cause the mobile device to vibrate or make a noise. In this way, gesture interpretation module 208 acknowledges that the touch gesture was detected.

When gesture interpretation module 208 detects a matching touch gesture, lock action module 214 may initiate an action. Lock action module 214 may initiate any type of action. In an example, the action may change a setting on the mobile device, such changing the volume or disabling sounds or alarms. In another example, the action may execute an application, such as a game, on the mobile device. The mobile device may enable a user to download and install applications to expand the functionality of the mobile device. The action may result in the display of data to the user while the touch screen is locked. A user may be able to define an action that corresponds to a particular gesture. For example, a user may be able to define an "at the beach" or "on vacation" gesture that silences the mobile device and clears the day's schedule on the user's calendar. In an embodiment, the action may access and display personal data from personal database 212.

Personal database 212 may store personal data relating to a specific user, such as calendar data, contact data, emails and text messages. This information may be particularly sensitive and, for that reason, requiring authentication to access it may be particularly useful. In that way, if a user misplaces her mobile device, or if the mobile device is stolen, the data remains secure.

In an example operation, a user may define a gesture to view the day's schedule using gesture definition module 204. Data defining the gesture and indicating the corresponding action is stored in gesture database 206. When the mobile device is locked, the user may input the previously defined touch gesture. Gesture interpretation module 208 identifies the inputted touch gesture and instructs lock action module 214 to display the calendar data while the mobile device remains locked. Lock action module 214 may retrieve the schedule for that day and display to the user. In this way, mobile device 214 may securely display calendar data to the user, without having to unlock the device.

Each of the gesture definition module 204, gesture interpretation module 208, lock action module 214, and lock screen module 210 may be implemented in hardware, software, firmware, or any combination thereof.

Gesture database 206 and personal database 212 may be any type of persistent memory including, for example, a SQL database.

Mobile device 200 may be implemented on any type of mobile computing device. Such computing device can include, but is not limited to, a personal computer, mobile device such as a mobile phone, workstation, embedded system, game console, television, set-top box, or any other computing device. Further, a computing device can include, but is not limited to, a device having a processor and memory for executing and storing instructions. Software may include one or more applications and an operating system. Hardware can include, but is not limited to, a processor, memory and graphical user interface display. The computing device may also have multiple processors and multiple shared or separate memory components.

Figure 3A:
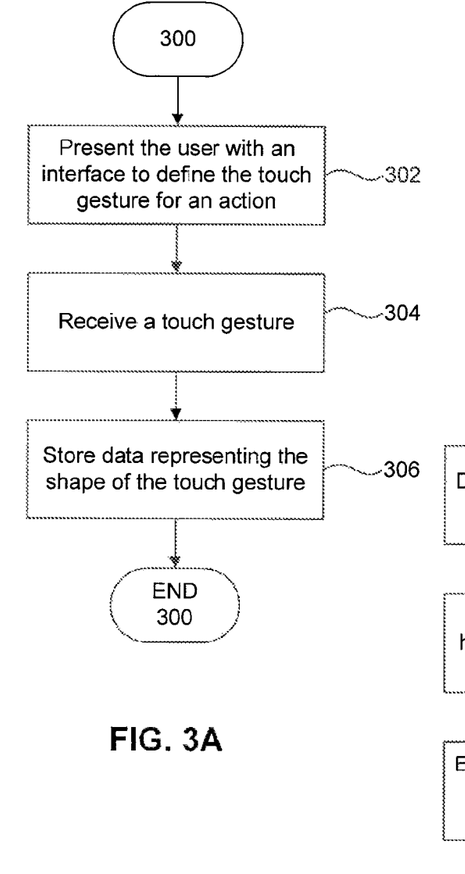
FIG. 3A is a flowchart that illustrates a method for defining a touch gesture.

FIG. 3A shows a flowchart illustrating a method 300 for defining a touch gesture. In an embodiment, method 300 may be used in operation of gesture definition module 204. In an example, method 300 may only be executed when the user is authenticated or when the device is unlocked.

At step 302, a user is presented with an interface to define a touch gesture for an action. For example, a user may select an action and the mobile device may prompt to user to input a touch gesture to execute the action while locked. In other examples, the interface may enable a user to define a sequence of actions to execute in response to the touch gesture. To enable the user to define the touch gesture, the mobile device may present a 9-dot pattern as described with respect to FIG. 4 below.

At step 304, the mobile device receives a touch gesture from the user. For example, the user may touch a position on the touch screen. While remaining in contact with the touch screen, the user may move her finger along the surface of the screen. The touch gesture may terminate when the user removes her finger from the surface of the touch screen. As mentioned above, in other examples, a gesture may include a series of strokes on the touch screen.

At step 306, data is stored representing the shape of the touch gesture received in step 304. The data may represent the shape of the touch gesture. For example, the data may represent may represent the path on the touch screen of the mobile device. In this way, by enabling a user to define the gesture, the gesture may be used to authenticate the user prior to executing an action while the mobile device is locked.

Figure 3B:
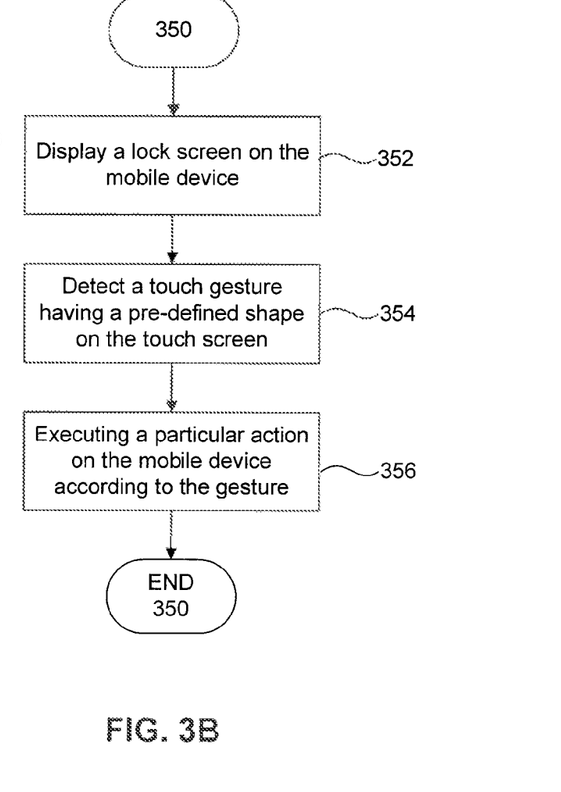
FIG. 3B is a flowchart that illustrates a method for detecting a touch gesture and executing an action in response to the touch gesture, according to an embodiment.

FIG. 3B shows a flowchart illustrating a method 300 for detecting a touch gesture and executing an action in response to the touch gesture. In an embodiment, method 300 may be executed on mobile device 200 in FIG. 2.

At step 352, a lock screen view may be displayed on the mobile device to prevent unauthorized or inadvertent access to a mobile device. The mobile device may prevent inadvertent access by failing to react to any other input until a particular touch gesture input is received. The mobile device may prevent unauthorized access if the particular touch gesture input that has been previously defined by the user.

At step 354, a touch gesture is detected on the touch screen of the mobile device, while the mobile device is locked. Data representing the inputted touch gesture may be compared with data representing the pre-defined touch gestures. In an embodiment, the shape of the inputted touch gesture may be compared with the shape of pre-defined touch gestures. The shapes may be compared independent of their position on the touch screen of the mobile device. In this way, by comparing the shape of the touch gesture independent of its position, a user can input the touch gesture without looking at the touch screen.

If the inputted touch gesture matches a pre-defined touch gesture, then an action corresponding to the touch gesture is executed while the mobile device is locked at step 356. In this way, a user may execute an action while the mobile device remains locked.

Figure 4:
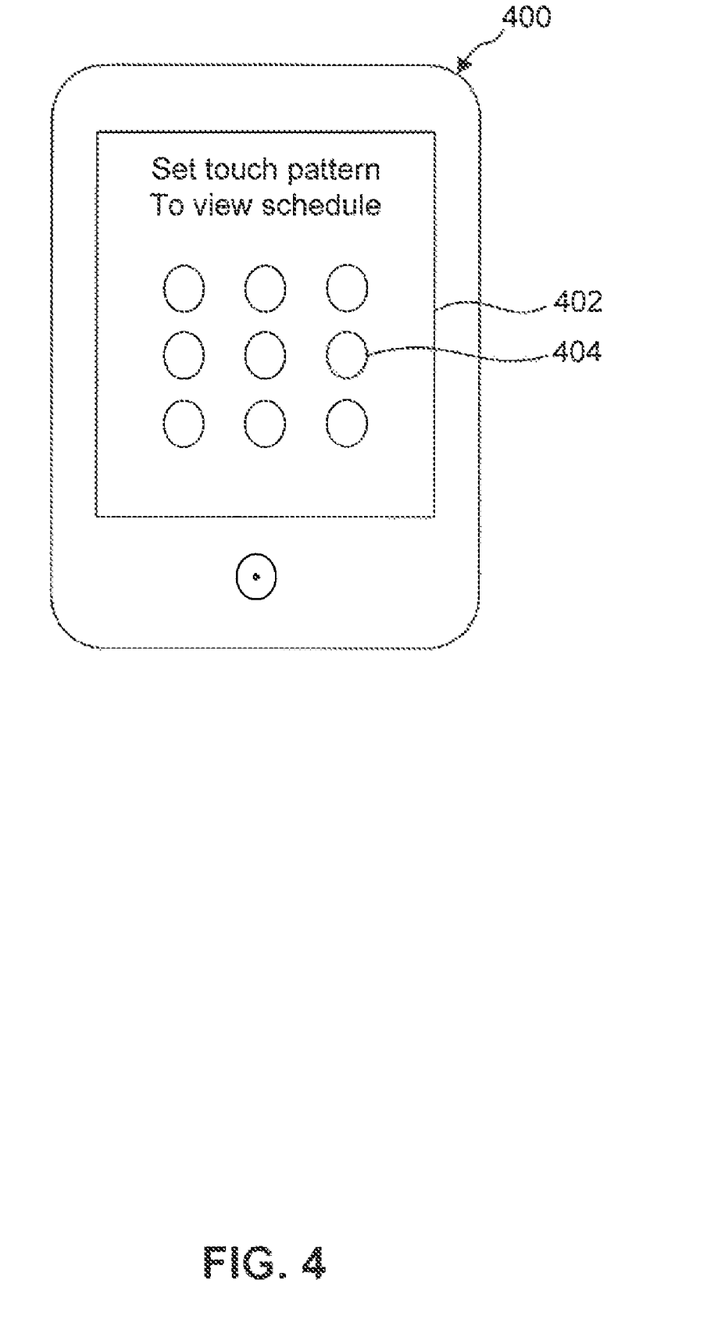
FIG. 4 is diagram that illustrates an interface to define a touch gesture to execute an action from a lock screen view to execute an action, according to an embodiment.

FIG. 4 is diagram 400 illustrating an interface 402 to define a touch gesture to execute an action from a lock screen view to execute an action, according to an embodiment. Interface 402 includes a number of dots, such as dot 404. In an example, interface 402 may include nine dots. By moving her finger between dots, a user can more precisely enter the touch gesture. A user may input a touch gesture by moving her finger between the dots in interface 402. The gesture may be defined by the dots that the user touches and the order in which the user touches them. In examples, interface 402 may be used by gesture definition module 204 to define a touch gesture and gesture interpretation module 208 to receive a touch gesture.

The Summary and Abstract sections may set forth one or more but not all exemplary embodiments of the present invention as contemplated by the inventor(s), and thus, are not intended to limit the present invention and the appended claims in any way.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What is claimed is:

1. A computer-implemented method for executing an action on a mobile device, comprising:
outputting, at a touch screen of the mobile device, a lock screen view configured to prevent unauthorized or inadvertent access to the mobile device;
while the lock screen view is displayed at the touch screen:
detecting, at the touch screen, a touch gesture having a pre-defined shape, wherein the touch gesture is entered by a user at any position on the touch screen, the touch gesture being of any size relative to the pre-defined shape; and
in response to detecting the touch gesture, executing, by the mobile device a particular action determined, at least in part, on the pre-defined shape, whereby detection of the touch gesture causes the particular action to execute while the lock screen view is displayed at the touch screen;
whereby executing the particular action while the lock screen view is displayed at the touch screen and in response to the touch gesture being entered at any position on the touch screen prevents inadvertent access while the mobile device is obscured from view.

2. The method of claim 1, further comprising:
authenticating the user;
unlocking the mobile device; and
when the mobile device is unlocked, receiving the touch gesture entered by the user that, when detected, causes the mobile device to execute the particular action, whereby detection of the user-defined shape securely authorizes execution of the particular action while the lock screen view is displayed at the touch screen mobile.

3. The method of claim 2, wherein executing the particular action comprises:
accessing personal data stored on the mobile device; and
outputting the personal data while the lock screen view is displayed at the touch screen.

4. The method of claim 3, wherein
accessing the personal data includes retrieving calendar appointment data scheduled for a current date stored on the mobile device, and
outputting the personal data includes displaying at least a portion of the calendar appointment data at the touch screen.

5. The method of claim 3, wherein
accessing the personal data includes retrieving a media file stored on the mobile device; and
outputting the personal data includes playing the media file on the mobile device.

6. The method of claim 1, further comprising:
authenticating the user;
unlocking the mobile device; and
when the mobile device is unlocked, displaying, at the touch screen, the pre-defined shape of the touch gesture that, when detected, causes the mobile device to execute the particular action.

7. The method of claim 1, further comprising:
in response to a user query, displaying, at the touch screen, the pre-defined shape of the touch gesture that, when detected, causes the mobile device to execute the particular action.

8. The method of claim 1, wherein executing the particular action includes changing an unsecure setting of the mobile device.

9. The method of claim 8, wherein changing the unsecure setting includes silencing the mobile device.

10. The method of claim 8, wherein changing the unsecure setting includes increasing or decreasing a volume of the mobile device.

11. A mobile device for executing an action comprising:
a lock screen module configured to output, at a touch screen of the mobile device a lock screen view configured to prevent unauthorized or inadvertent access to the mobile device;
a gesture interpretation module that, while the lock screen view is displayed at the touch screen is configured to detect, at the touch screen, a touch gesture having a pre-defined shape, wherein the touch gesture is entered by a user at any position on the touch screen, the touch gesture being of any size relative to the pre-defined shape; and a lock action module that, in response to detecting the touch gesture and while the lock screen view is displayed at the touch screen, is configured to execute, by the mobile device, a particular action on determined, at least in part, on the pre-defined shape;

at least one memory unit that stores each of the lock screen module, the gesture interpretation module, and the lock action module;

at least one computer processor that implements each of the lock screen module, the gesture interpretation module, and the lock action module;

whereby detection of the touch gesture initiates the particular action while the lock screen view is displayed at the touch screen; and whereby executing the particular action while the lock screen view is displayed at the touch screen and in response to the touch gesture being entered at any position on the touch screen prevents inadvertent access while the mobile device is obscured from view.

12. The mobile device of claim 11, wherein the lock screen module is configured to receive an input to authenticate the user and/in response to the authenticated input, unlock the mobile device, and further comprising:

a gesture definition module that, when the mobile device is unlocked, is configured to receive the touch gesture entered by the user that, when detected by the gesture interpretation module, causes the lock action module to execute the particular action, whereby detection of the user-defined shape securely authorizes execution of the particular action while the lock screen view is displayed at the touch screen.

13. The mobile device of claim 12, wherein the particular action executed by the lock action module includes accessing personal data stored on the mobile device and outputting the personal data while the lock screen view is displayed at the touch screen.

14. The mobile device of claim 13, wherein the particular action executed by the lock action module includes retrieving calendar appointment data scheduled for a current date stored on the mobile device and displaying at least a portion of the calendar appointment data at the touch screen.

15. The mobile device of claim 13, wherein the particular action executed by the lock action module includes retrieving a media file and playing the media file.

16. The mobile device of claim 11, wherein the lock screen module receives an input to authenticate the user and, in response to the authenticated input, unlocks the mobile device, and further comprising:

a gesture definition module that, when the mobile device is unlocked, is configured to display, at the touch screen, the pre-defined shape of the touch gesture that, when detected by the gesture interpretation module, causes the lock action module to execute the particular action.

17. The mobile device of claim 11, further comprising a gesture definition module that, in response to a user query, displays, at the touch screen, the pre-defined shape of the touch gesture that, when detected by the gesture interpretation module, causes the lock action module to execute the particular action.

18. The mobile device of claim 11, wherein the particular action executed by the lock action module includes changing an unsecure setting of the mobile device.

19. The mobile device of claim 18, wherein changing the unsecure setting includes silencing the mobile device.

20. The mobile device of claim 18, wherein changing the unsecure setting increases or decreases a volume of the mobile device.

* * * * *